MICHAEL J. STEIN.
Improvement in Apparatus for Rendering and Drying Animal Matter.
No. 125,111.  4 Sheets--Sheet 4.  Patented March 26, 1872.
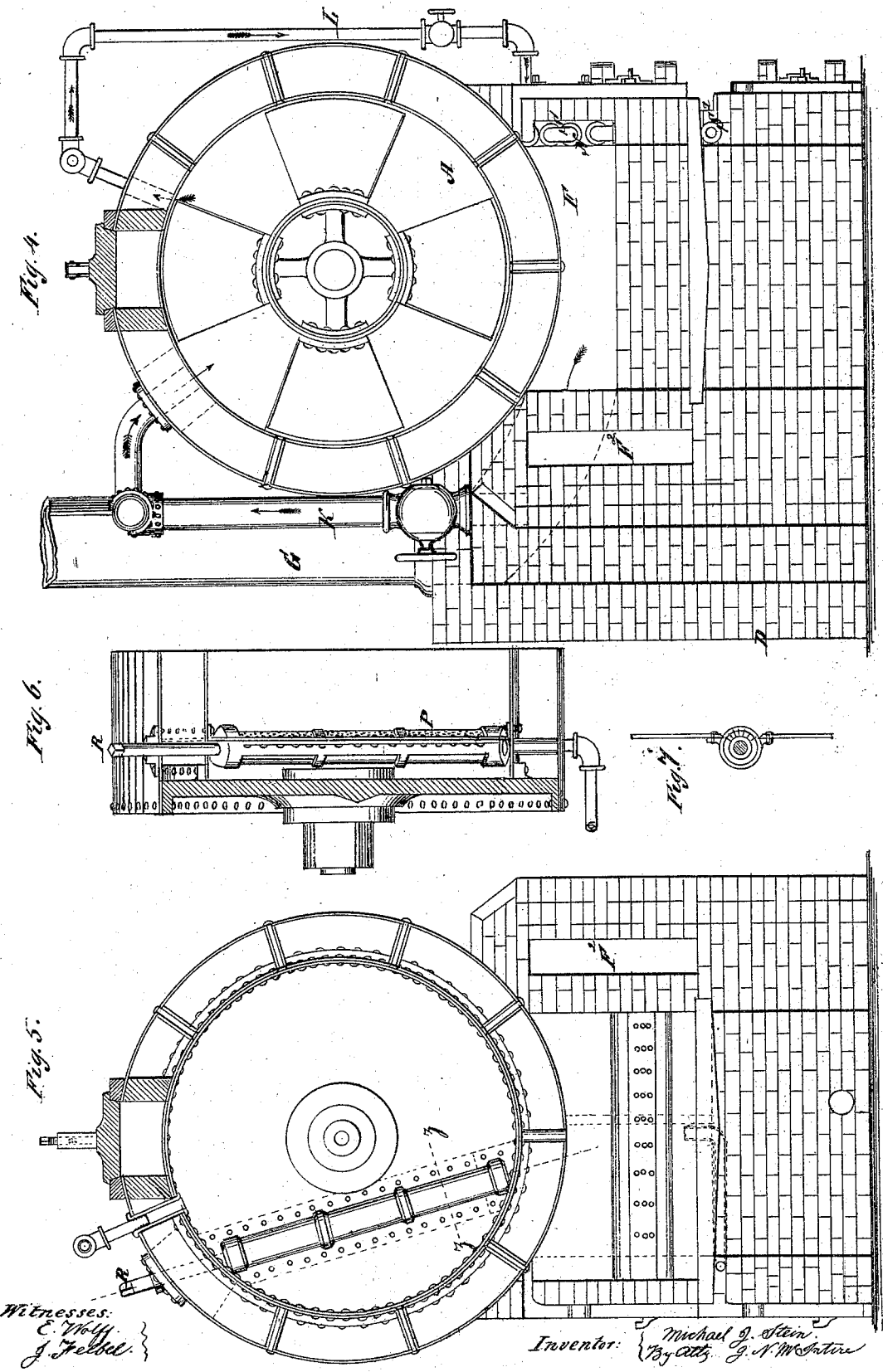
Witnesses:
E. Wolff
J. Felbel
Inventor:
Michael J. Stein
By Atty. J. N. McIntire

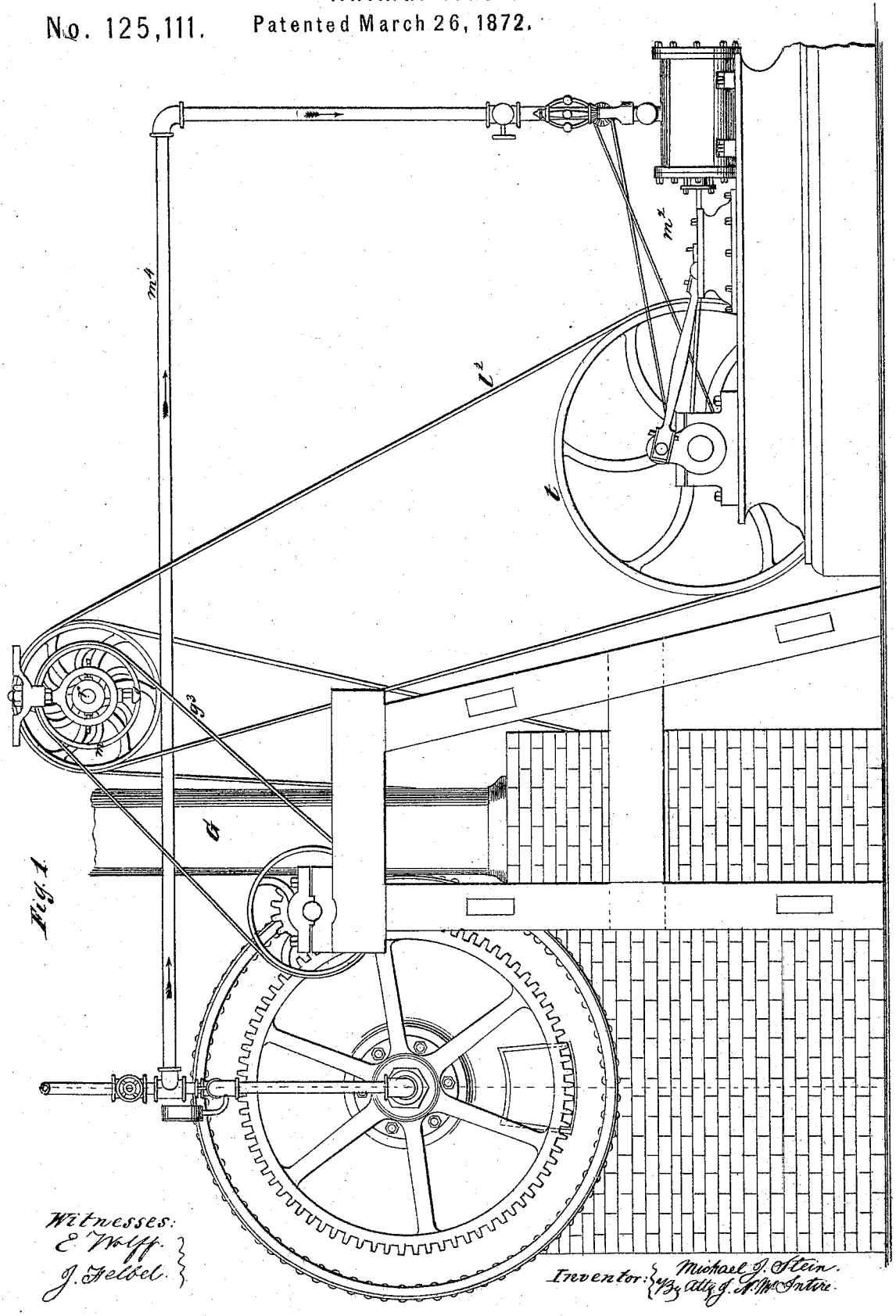

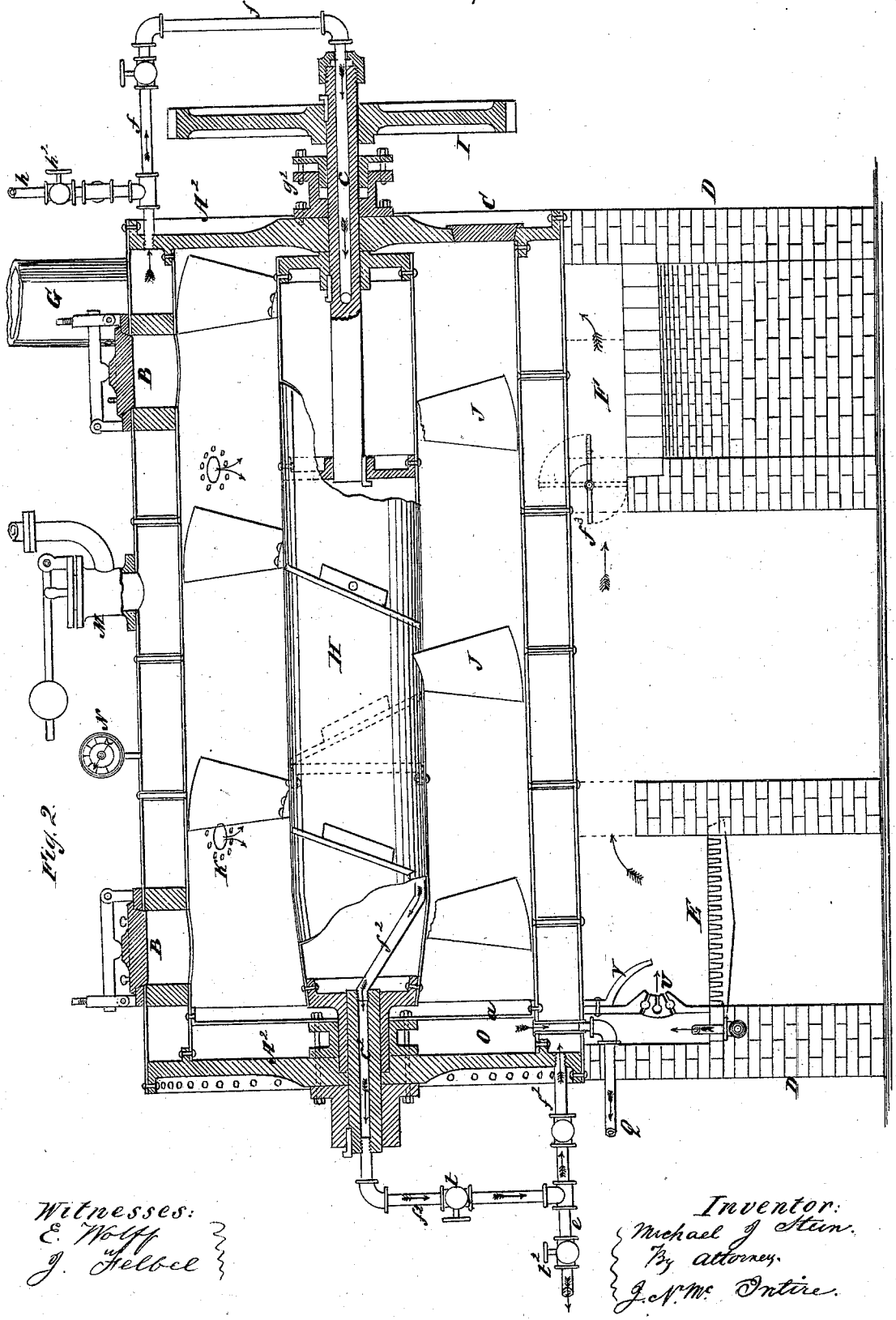
MICHAEL J. STEIN.
Improvement in Apparatus for Rendering and Drying Animal Matter.
No. 125,111. Patented March 26, 1872.

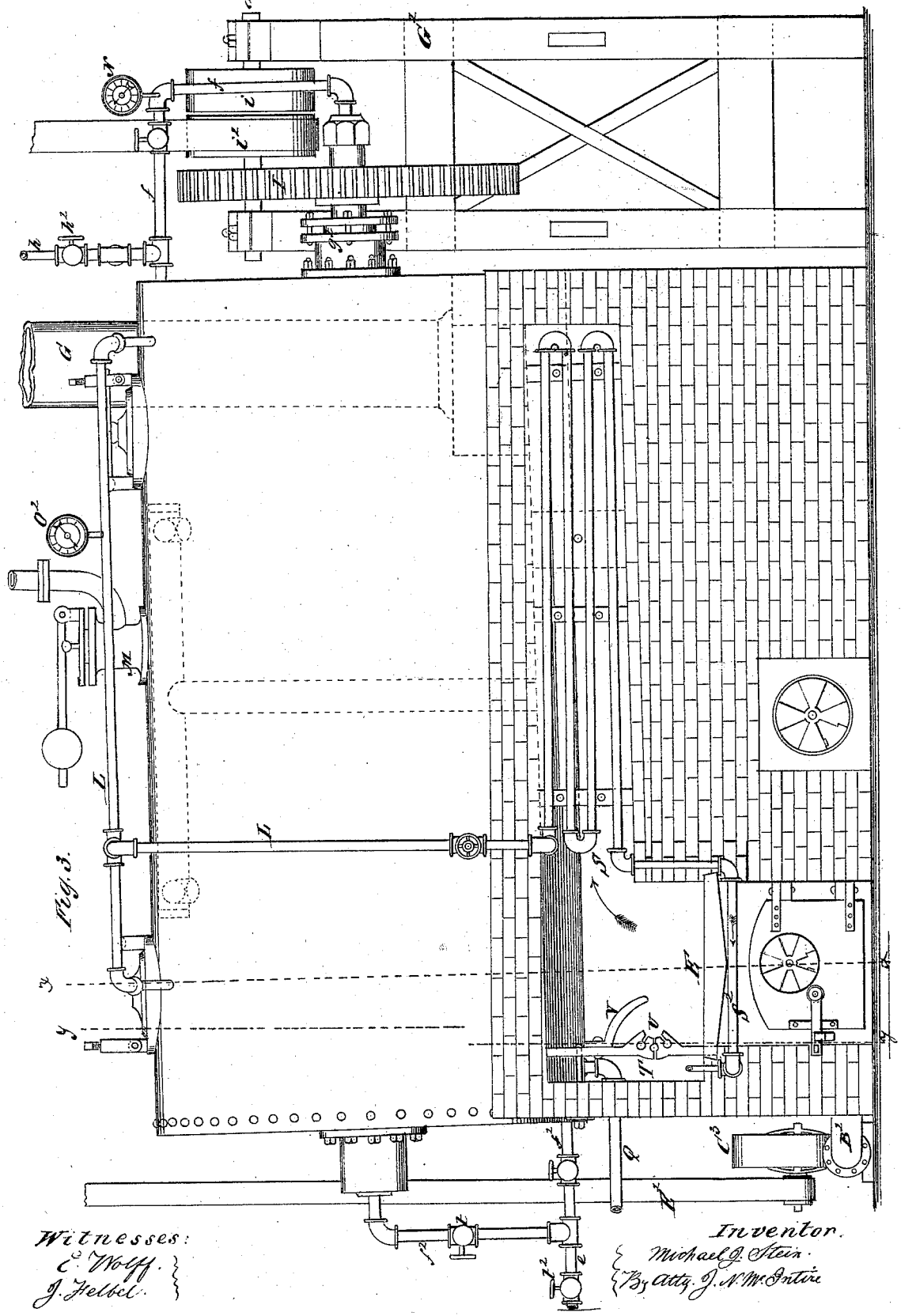

125,111

UNITED STATES PATENT OFFICE.

MICHAEL J. STEIN, OF NEW YORK, N. Y.

IMPROVEMENT IN APPARATUS FOR RENDERING AND DRYING ANIMAL MATTERS.

Specification forming part of Letters Patent No. 125,111, dated March 26, 1872.

*To all whom it may concern:*

Be it known that I, MICHAEL J. STEIN, of New York city, in the county and State of New York, have invented a new and useful Apparatus for Rendering Animal Matter and Drying the "Scrap" thereof; whereby the said processes of rendering and drying may be conducted without the escape of any noxious odors or other nuisances, and with much more efficiency and economy than they can be practiced with the apparatus heretofore used.

Previous to my invention various apparatus have been devised for rendering and drying (and some for grinding) the scrap, but none of them have been adapted to the practicing of a continuous process of rendering and drying, and they have all been subject to serious objections in many respects.

My invention has for its object to provide an apparatus in which the process of rendering and drying animal matter may be continuously conducted, very economically, and without any nuisance; and adapted also to the process of extracting the serum and water from the animal blood. And to these ends my invention consists in an organized apparatus, substantially such as hereinafter described, adapted to the performance of a continous process, in which the charge placed in the rendering vessel is cooked, the fat and liquid matter separated from the solid, and the scrap then thoroughly dried, without the escape of any offensive odors.

To enable those skilled in the art to make and use my new apparatus, I will proceed to describe its construction and operation, referring by letters to the accompanying drawing forming part of this application, and in which—

Figure 1 is an elevation; Fig. 2, a vertical longitudinal section; Fig. 3, a sectional elevation; Fig. 4, a vertical cross-section at $x\ x$, Fig. 3; Fig. 5, a similar section at $y\ y$, Fig. 3; Fig. 6, a partial sectional elevation of the air-tight vessel; and Fig. 7, a detail view (cross-section at $z\ z$, Fig. 5) of the liquid valve.

In the several figures the same part is designated by the same letter of reference.

A is a cylindrical (boiler-like) shell, with solid ends or heads $A^2$, and mounted in brickwork D, in which is a furnace, E, and flues F and $F^2$ for the products of combustion to pass through. G is a chimney or smoke-pipe. B B are the inlet man-holes in the vessel or chamber A, all of which openings or man-holes are made so that they may be opened and hermetically closed, as may be desired. H is a drum, mounted axially, within the vessel or tank A, upon journals or shafts $c$ and $c^2$, and provided with a series of arms, J. One of the shafts of said drum (the one marked $c^2$) is fitted tight in one head of the tank A, and the drum H arranged to turn freely thereupon, while the other shaft (that marked $c$) is made fast to the drum H, and turns in a suitable stuffing-box bearing at $g^2$ in the other head of said tank A. On the shaft $c$ is secured a gear-wheel, I, to which motion may be applied to effect the rotation, at pleasure, in either direction of the drum H. From the steam-space or shell of vessel A, at one end, near the top, extends a pipe, $f$, as shown, which communicates with the hollow shaft $c$ and conveys steam thence into the drum H, while from the other shaft ($c^2$) of said drum extends a pipe, $f^2$, which communicates with the lower opposite end portion of the shell of vessel A, as shown. $h$ is a branch pipe from $f$, provided with a suitable cock, $h^2$, and used to allow the escape of steam from the boiler-portion or shell of A, and $e$ is a branch from $f^2$, having a cock, $t^2$, and used to draw off the water from the boiler. M is an ordinary safety-valve, and N a steam-gauge, connecting with the boiler or shell-portion of vessel A; and $O^2$ is a gauge connected to pipe L, which communicates with the interior or rendering-chamber of vessel A. The rendering vessel has a small portion at one end partitioned off by a disk, $a$, to form a separate compartment, O, from which extends a conduit-pipe, Q, to the coolers. P is a register-like valve arranged in the partition $a$, and adapted to make and cut off communication between the compartment O, or fat and liquid chamber, and the main portion or rendering or cooking chamber of the vessel A. The valve P has a stem, R, which protrudes through the shell of A, and by which it is turned at pleasure. K are pipes which lead from the hot-air flues $F^2$ to the interior or rendering-chamber of A, and L are pipes which lead from the rendering-chamber down to a superheater, S, from which a pipe, $S^2$, passes under the furnace to a chamber, T. With the air-pipe $B^2$, which leads to the furnace, is connected a blower, $c^3$, driven by a suitable belt, $E^2$, for forcing a blast into the furnace, and thence to the vessel A, as and for purposes to be presently explained. U is an argand-burner device, in which are ignited currents of air and gas, to assist combustion in the furnace E. Near one end of the vessel A is a suitable frame-work, $G^2$, in which are mounted a driving-shaft, $d^2$, and fast and loose pulleys $i\ i^2$, which are belted at $g^3$ to a pulley, $m$, on the counter-shaft $r$, which is driven, by a belt, $l^2$, from the main pulley or fly-wheel $l$ of an engine, $m^2$; and this engine may be supplied with steam by a pipe, $m^4$, from the boiler-portion of vessel A. (See Fig. 1.)

The operations of cooking or rendering any and all sorts of animal matter in this apparatus, separating the liquid matters from the "scrap," and thoroughly drying the latter, are as follows: The shell or boiler-portion of tank A, having been about half filled with water, the fires are started, and the interior or rendering-chamber of A is filled with the matter to be treated, the man-holes being closed so as to leave the chamber containing the charge hermetically sealed. As the water in the boiler is converted into steam, which passes into and through the drum H, through pipes $f$ and $f^2$, as indicated by the arrows, the interior of vessel A and the contained charge is heated up by the heat radiated from the interior of vessel A and the exterior of drum H, and the fat melted out. As the cooking of the charge progresses, steam will be generated within the rendering-chamber, which will tend to cut up and assist the rendering of the animal matter, and the rendering operation may be augmented or facilitated by turning the drum H in first one and then another direction, and causing its helically-arranged arms J to stir up or agitate the mass of material. Whenever necessary, for the discharge of any portion of the fat and liquid contained in the rendering-chamber, the valve P is opened, so as to permit the free passage of fat and water from the rendering-chamber into the compartment O, from whence it is carried off by exit-pipe Q. In the performance of rendering, and the subsequent drying operation, the gases and vapors generated in the chamber containing the charge are carried off in the pipes L to the superheater S, and thence to the furnace to assist in the combustion, by which heat is kept up in the vessel A. A constant circulation of the steam generated in the boiler or shell-portion A is kept up through the shell and drum H by the arrangement of the tubes $f$ and $f^2$, as shown and described; and by the conjoint action of the heat radiated from the interior of the steam-shell and exterior of drum H, the live steam generated in the mass or charge, and the stirring operation, the rendering process is most efficiently, economically, and expeditiously performed, and is accomplished without any escape of offensive odors, since all the vapors and noxious gases generated in the rendering-chamber can pass off only through the tubes L, which lead to the superheater, from whence said vapors and gases must pass to the furnace and there be consumed. After the rendering has been completed and all the fat drawn off through the valve P and compartment O, the said valve is closed, and by a continuance of the heat and the agitation of the mass the "scrap" or "greaves" is deprived of all water or moisture by conversion of the latter into steam. During the drying operation, to which the scrap is now subjected, the mass is partially broken up or disintegrated by a suitable motion of the drum H and arms J, and this breaking of the mass or residuum, it will be seen, greatly facilitates the conversion into steam of all contained moisture. As the drying process continues the generated vapors and gases are highly heated and pass off to the superheater, and thence to the furnace, to assist in the combustion of the boiler-furnace fire, and to complete the drying of the scrap, and insure the consumption of all vapors and gases contained in the drying and rendering chamber. I now open the cocks in pipes K, close damper $f^3$, and set the blower in motion, when blasts or currents of hot air will be forced into the chamber and will pass off to the superheater under pressure, carrying along all remaining gases or vapors and leaving the scrap in a dry condition. By opening the discharge man-hole C and turning the drum H continually in the proper direction, the helically-arranged arms J of said drum will feed along and force out the mass of dried "scrap." The proper times for relieving the rendering-chamber of undue pressure, and permitting the escape of the generated vapors and gases, the regulation of the various operations and manipulation of the apparatus, will, of course, have to be left, in a measure, to the skill and discretion of the experienced attendant, and will all vary some, under various conditions of material, &c.

It will be understood that many of the forms of parts and the details of construction of my new apparatus may be varied without departing from the spirit of my invention.

In the use of my new apparatus for the treatment of animal blood the vessel A is charged to about half or two-thirds its containing capacity, and the charge having been subjected to the process of coagulation by the heated surfaces during agitation, the charge is then allowed to rest and the clot or fiber to settle. A large portion of the serum or liquid may then be drawn off through valve P, and the charge being then subjected to the action of the heat with the stirrers in motion, the coagulated mass is soon deprived of all its remaining moisture, the latter being converted into steam, and, together with all noxious gases and odors evolved, forced into the superheater, and thence to the fire for consumption. The blast of hot air may now be forced into the chamber to complete the drying and consummate the destruction of all gases and vapors contained in the chamber.

Although I have described my new apparatus as adapted to and intended to be used for the carrying on of the conjoint or continuous processes of rendering and drying, it will be understood that it may be used for either one of these processes separately, with great advantage over the heretofore-known apparatus for such separate processes. I have shown an ordinary fast-and-loose pulley (to be used with a belt and slipper in the well-known manner) for driving the stirrer, at pleasure, in either direction, but the rotation of the drum, with its helically-arranged arms, may, of course, be effected in any other desirable manner; and so many of the parts of the apparatus may be changed or varied in construction without varying the mode of operation of the machine or losing any of its advantages.

Having so explained the construction and operation of my new apparatus that one skilled can make and use it, what I claim therein as new, and desire to secure by Letters Patent, is—

1. In combination with the vessel A adapted to contain the material to be cooked, and a rotatory hollow drum adapted to be heated, and provided with agitators, the conductors leading from the closed chamber to the furnace, so that the action of the radiated, heated, and live steam on the charge, and escape of vapors and gases to assist in heating up, may be controlled and applied substantially as described.

2. In combination with the cooking-chamber and heating and agitating drum with helically-arranged arms, suitable means for turning the drum in either direction, at the pleasure of the attendant, for the purposes set forth.

3. In combination with the cooking or rendering-chamber, an auxiliary compartment, separated from it by a partition in which is placed a suitable valve or valves, substantially as described, for the purposes set forth.

4. In combination with the rendering and drying chamber, the liquid compartment and its valve, and the furnace, the blast-pipes, the pipes passing from the said chamber to the fire, and a proper damper in the furnace, whereby the liquid and solid matters may be separated, the scrap dried, and the gases and vapors generated in both processes consumed in the manner described.

In testimony whereof I have hereunto set my hand and seal this 7th day of March, 1872.

MICHAEL J. STEIN. [L. S.]

In presence of—
 CHAS. E. WARREN,
 J. FELBEL.